Apr. 17, 1923.  1,452,280
J. G. MACLAREN
PNEUMATIC DISPATCH SYSTEM
Filed Aug. 19, 1920   2 Sheets-Sheet 1

INVENTOR
James G. Maclaren
BY
Abel L. Brownrigg
ATTORNEY

Apr. 17, 1923.  
J. G. MACLAREN  
PNEUMATIC DISPATCH SYSTEM  
Filed Aug. 19, 1920  
1,452,280  
2 Sheets-Sheet 2

INVENTOR  
James G. Maclaren  
BY  
ATTORNEY

Patented Apr. 17, 1923.

1,452,280

UNITED STATES PATENT OFFICE.

JAMES G. MACLAREN, OF MAMARONECK, NEW YORK.

PNEUMATIC-DISPATCH SYSTEM.

Application filed August 19, 1920. Serial No. 404,637.

*To all whom it may concern:*

Be it known that I, JAMES G. MACLAREN, a citizen of the United States, residing at Mamaroneck, in the county of Westchester and State of New York, have invented certain new and useful Improvements in Pneumatic-Dispatch Systems, of which the following is a specification.

This invention relates generally to pneumatic dispatch systems.

In the development of apparatus for facilitating transactions between scattered stations throughout a commercial establishment and a central office, pneumatic dispatch systems have come into general use. The most extensively known form of apparatus used in such installations include a plurality of individual pneumatic tubes leading from the outlying stations to the office, each tube being provided at its delivery end with separator or selector mechanism for segregating two classes of carriers ordinarily employed and delivering one class, containing cash, to one or more cash clerks and carriers of the other class to a credit authorizing clerk. Such systems are suitable for use only in relatively small establishments.

In large establishments, such as department and mail-order stores, more elaborate equipment is necessary. An example of an installation for this purpose consists of a group of tubes arranged to discharge the two classes of carriers, in the indiscriminate order in which they arrive, onto a conveyor belt common to all the tubes and from which operators select the carriers of one class and dispatch them through return tubes to the sending stations. The carriers of the other class in such systems are permitted to travel to the end of the conveyor belt and drop into a suitable receptacle from which they are taken and despatched through another set of tubes to a central desk.

A later development has consisted of a similar arrangement in which separator devices, such as were used in the individual tube systems referred to, were mounted in the delivery ends of the tubes and operated to deposit each class of carriers on separate conveyor belts leading to a common despatching desk. In order to enable a considerable number of operators to pick cash carriers from the corresponding belt, make change, and redeposit the carriers on a third conveyor belt for delivery to the despatching desk for returns through the proper tubes to the sending stations, the belts were arranged in horizontal superposed relation with operators' stations arranged along both sides of the cash carrier belt which was arranged at a convenient height for the purpose. The credit carrier belt on which the other of the two classes of carriers was deposited by the separator mechanism was arranged to deliver the carriers into a receptacle also in convenient reach of the despatching clerk who transferred the carriers to tubes leading to an authorizing station. In a system of this type, it will be clear that the length of the belts must be very substantial in order to provide for a sufficient number of cash clerks' stations, and that a large amount of floor space was used.

The systems referred to, while well adapted to fill the requirements of a relatively small establishment or, on the other hand, of a very large establishment, are not adapted in either case to be utilized to good advantage in connection with the very large class of establishments of medium or intermediate size. It is accordingly the object of this invention to provide a pneumatic dispatch system particularly adapted for use in establishments of medium size where the amount of floor space used and the number of operators employed must of necessity be relatively restricted.

I have found that instead of mounting selector mechanism in each incoming tube at the receiving station, I can arrange a plurality of tubes to deposit their indiscriminately arranged carriers on a relatively short length of conveyor belt mounted at a sufficient elevation to be out of the way of the operators and to cause the conveyor belt to deliver the carriers to one or more selector mechanisms. The selectors deliver the two classes of carriers in turn to two conveyor belts along one of which operators are stationed as in a previously described system, the other belt operating to discharge its carriers directly into the receiving ends of pneumatic dispatch tubes leading directly to the authorizing clerk's desk and without the intervention of an operator. It will be seen that by causing the incoming tubes to discharge onto a belt separate from the belt which supplies the cash operators, I succeed in greatly decreasing the length of belt required for the cash carriers, since the belt is not extended in length to provide room for delivery tubes.

Another important advantage secured resides in a construction which provides for a less number of selector tubes than incoming conveyor tubes; in other words, I succeed in causing each selector device to serve more than one tube, thus obtaining a considerable economy and gain in efficiency of operation. In addition, by causing the automatic dispatch of one class of carriers directly to a common destination and without the intervention of an operator, I succeed in still further simplifying the mode of operation of the apparatus and greatly accelerate the speed of transmission of the credit carriers from the sending stations to the authorizing desk. Other features of the invention include the provision of means for insuring the delivery of the carriers in an endwise rather than a transverse relation from the end of the belt conveyors to thereby facilitate the reception by the selector mechanism or the credit dispatch tubes.

In the drawing:

Fig. 4 is an enlarged view showing a carrier guide device forming a portion of the invention.

Figure 1:
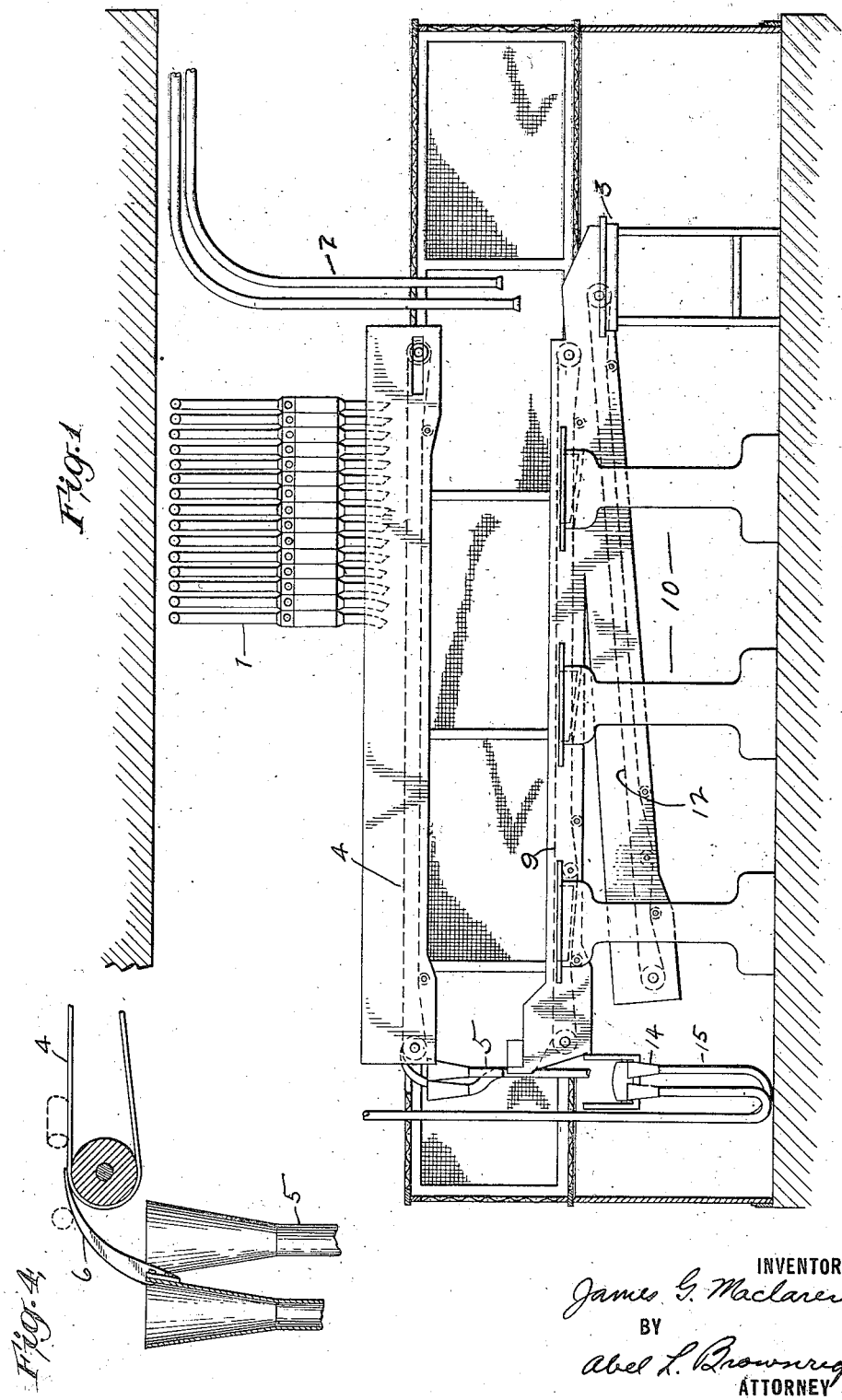
Fig. 1 is a side elevation of a pneumatic dispatch apparatus embodying my invention.

Referring to the drawings, there is shown at 1, a section of the discharge ends of a group of incoming pneumatic dispatch tubes whose receiving ends are situated at various scattered stations throughout the structure in which the system is installed. At 2 is illustrated the receiving ends of a corresponding group of outgoing or return tubes which are arranged adjacent a despatching desk 3, where an operator is stationed to manually place carriers within the entrance ends of the tubes for return to the sending stations following consideration of the contents of the carriers by the designated operators.

Figure 2:
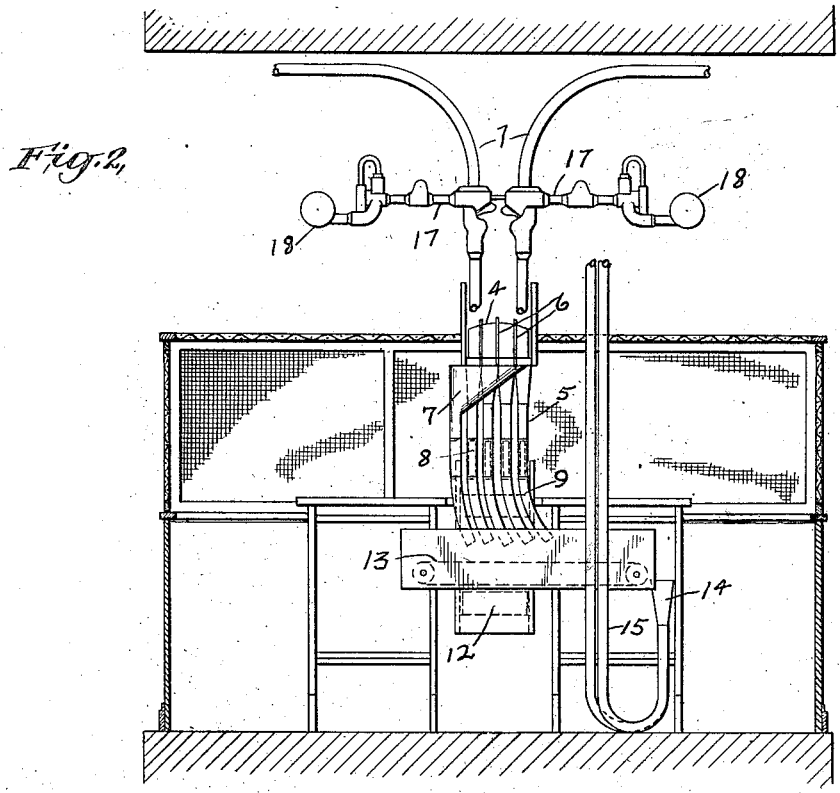
Fig. 2 is an end view of the apparatus shown in Fig. 1.
Figure 3:
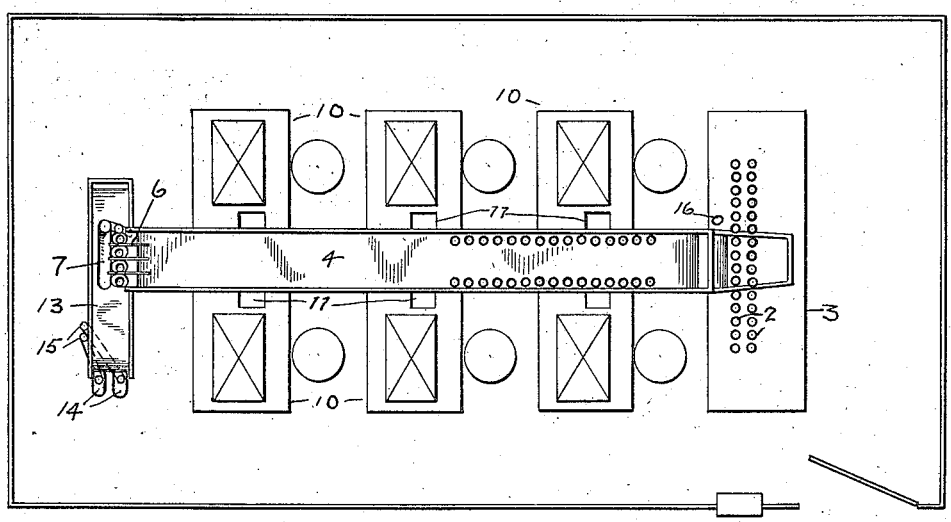
Fig. 3 is a plan view of the apparatus shown in Fig. 1.

The incoming tubes 1 are arranged to deliver in the indiscriminate order in which they are conveyed carriers of two classes or types directly onto a horizontal conveyor belt 4 operating at a sufficient elevation to permit the carrying on of other operations beneath and thus conserve valuable floor space. As is shown in Fig. 2 of the drawing, the conveyor belt 4 is caused to assume an upwardly bowed or convex formation in transverse section in order to cause the carriers to assume positions with their longitudinal axes parallel to the direction of travel of the belt in order to facilitate the delivery of the carriers into the receiving hoppers of a group of selector tubes 5. The delivery of the carriers into the selector mechanism is further assisted by the use of a set of guide fingers 6 which curve upwardly over the delivery end of the conveyor belt 4 and either direct the travel of the carriers endwise into the selector tubes between the fingers or permit a transversely placed carrier to roll over the top of the fingers into a selector tube having a specially formed receiving hopper 7.

The selector mechanism in the tubes 5 operates to discharge the class of carriers containing cash through suitable lateral openings 8 where they are deposited on the upper stretch of a conveyor belt 9, the course of which lies intermediate two rows of stations 10 where operators pick the carriers from the belt, make change, and redeposit the carriers in slots 11 through which they make their way to a conveyor belt 12 mounted at a lower level and arranged to discharge the carriers on the despatching desk 3, already referred to, for return to the distant sending stations by way of the return tubes 2.

The remaining class of carriers which contain credit or charge account memoranda are permitted by the selector mechanism to pass down through the selector tubes 5 and discharge on the relatively short conveyor belt 13, preferably arranged transversely to the length of the other conveyors in order to conserve space, which deliver the carriers in turn directly into the receiving hoppers 14 of one or more dispatch tubes 15 leading to a credit authorizing desk. When the authorizing clerk has acted, the carriers are despatched through a special tube 16 to the despatching desk 3 from which they are sent to the proper sending station in the usual way.

I may make use either of pressure or exhaust forces for conveying the carriers though the tubes or of any combination of such forces, as will be obvious, but, for convenience, I have illustrated an exhaust connection to the delivery end of the tubes 1 at 17, the connections 17 leading to suitable drums 18 communicating with a suitable exhaust pump mechanism.

What I claim is:

1. A pneumatic dispatch system comprising: a plurality of pneumatic tubes for conveying two classes of carriers in mixed order, and a selector device arranged to receive and separate the two classes of carriers conveyed by said tubes.

2. A pneumatic dispatch system comprising a plurality of pneumatic tubes for conveying two classes of carriers in mixed order, and a plurality of selector devices arranged to separate the two classes of carriers conveyed by said tubes, said selector devices being less in number than the number of said tubes.

3. A pneumatic dispatch system comprising a plurality of pneumatic tubes for conveying two classes of carriers, a conveyor common to said plurality of tubes for receiving the carriers conveyed by said tubes in mixed order, and a selector device arranged to receive the carriers from said conveyor and separate the two classes.

4. A pneumatic dispatch system comprising: a plurality of pneumatic tubes for conveying two classes of carriers, a conveyor common to said plurality of tubes for receiving the carriers conveyed by said tubes in mixed order, and a plurality of selector devices arranged to receive the carriers from said conveyor and separate the two classes.

5. A pneumatic dispatch system comprising: a plurality of pneumatic tubes for conveying two classes of carriers, a conveyor common to said plurality of tubes for receiving the carriers conveyed by said tubes in mixed order, selector mechanism arranged to receive the carriers from said conveyor and separate the two classes, a conveyor belt arranged to receive the carriers of one class, and stations for operators arranged along said conveyor belt.

6. A pneumatic dispatch system comprising: a plurality of pneumatic tubes for conveying two classes of carriers, a conveyor common to said plurality of tubes for receiving the carriers conveyed by said tubes in mixed order, selector mechanism arranged to receive the carriers from said conveyor and separate the two classes, a conveyor belt arranged to receive the carriers of one class, stations for operators arranged along said conveyor belt, and means for conveying said other class of carriers to a distant station.

7. A pneumatic dispatch system comprising: a plurality of pneumatic tubes for conveying two classes of carriers, a conveyor common to said plurality of tubes for receiving the carriers conveyed by said tubes in mixed order, selector mechanism arranged to receive the carriers from said conveyor and separate the two classes, a conveyor belt arranged to receive the carriers of one class, stations for operators arranged along said conveyor belt, a conveyor belt arranged to receive the other class of carriers from said selector mechanism, and a pneumatic tube for receiving carriers from the last-named belt for transfer to a distant station.

8. A pneumatic dispatch system comprising: a plurality of pneumatic tubes for conveying two classes of carriers, a conveyor common to said plurality of tubes for receiving the carriers conveyed by said tubes in mixed order, selector mechanism arranged to receive the carriers from said conveyor and separate the two classes, a conveyor belt arranged to receive the carriers of one class, stations for operators arranged along said belt, a second conveyor belt arranged along said stations to receive carriers from said stations, a despatching station for receiving carriers from said last-named belt, and a plurality of return tubes having their receiving ends arranged adjacent said despatching station.

9. In a dispatch system a belt for conveying carriers, a pneumatic dispatch tube arranged to receive carriers from said belt and a second conveying belt arranged to receive carriers from said tube.

10. In a dispatch system a belt for conveying carriers of different classes, a plurality of pneumatic tubes arranged to receive carriers from said belt and means for separating the carriers received by the tubes into their classes.

11. In a dispatch system a plurality of pneumatic tubes for conveying carriers of different classes, a conveyor belt for receiving carriers from said plurality of tubes, a tube for receiving and conveying carriers from said belt and means in said tube for separating the carriers into their classes.

12. In a dispatch system, a plurality of pneumatic tubes for conveying carriers, a conveyor belt for receiving carriers from said plurality of tubes, a plurality of tubes for receiving and despatching carriers from said belt and a conveying belt for receiving carriers from said second-named tubes.

13. In a dispatch system, a belt conveyor arranged to transport two classes of carriers in mixed order, selector mechanism arranged to receive carriers from said belt conveyor and separate the two classes, and a pneumatic tube for receiving and despatching one of said classes of carriers to a distant station.

14. In a dispatch system, a plurality of pneumatic tubes, a horizontally arranged conveyor belt mounted at an elevation that will not interfere with the activities of operators and arranged to receive two classes of carriers in mixed order from said tubes, selector mechanism for receiving carriers from said belt and separating said classes, a conveyor belt beneath said first-named belt at a height accessible to operators, stations for operators arranged along said belt, a conveyor belt beneath said last-named belt arranged to receive carriers deposited thereon by said operators, and a despatching station to which carriers are delivered by said last-named belt.

15. In a dispatch system, a plurality of pneumatic tubes, a horizontally arranged conveyor belt mounted at an elevation that will not interfere with the activities of operators and arranged to receive two classes of carriers in mixed order from said tubes, selector mechanism for receiving carriers from said belt and separating said classes, a conveyor belt beneath said first-named belt at a height accessible to operators for receiving one class of carriers from said selector mechanism, stations for operators arranged along said belt, a conveyor belt beneath said last-named belt arranged to receive carriers deposited thereon by said operators, a despatching station to which said carriers are delivered by said last-named belt, a belt conveyor for receiving the other class of carriers from said selector mechanism, said last-named conveyor operating at right angles to said other belts, and a pneumatic tube for receiving carriers from said transversely arranged belt.

16. In a dispatch system a series of operators' stations, a conveyor belt extending along said series of stations to deliver carriers at any station in the series, means at one end of the conveyor belt for separating two intermixed classes of carriers and depositing one class of carriers on said conveyor belt, means at the same end of the conveyor belt for receiving the other class of carriers from the separating means and conveying said carriers to a distant station, and a return dispatch station at the other end of the belt for the other class of carriers.

17. In a dispatch system, a double series of operators' stations, a conveyor belt extending between said two series of stations to deliver carriers at stations in either series, means at one end of the belt for separating two intermixed classes of carriers and depositing one class of carriers on said belt, a pneumatic tube at the same end of the belt for receiving the other class of carriers from the separating means and conveying said carriers to a distant station, and a conveyor belt extending in a substantially parallel relation to said first-named belt for conveying carriers deposited thereon by the operators to a return dispatch station at the other end of the first-named belt.

Signed at New York, in the county and State of New York, this 10th day of August, 1920.

JAMES G. MACLAREN.